United States Patent [19]

Slavik et al.

[11] Patent Number: 4,682,958
[45] Date of Patent: Jul. 28, 1987

[54] DATA ENTRY TERMINAL AND MEMORY MODULE THEREFOR

[75] Inventors: William H. Slavik, Palos Hills; William P. Carlson, Hanover Pk.; George L. Cepynsky, Woodridge; Paul G. Dussault, Barrington; Steven E. Margison, Downers Grove; James A. Wolf, Jr., Deerfield, all of Ill.

[73] Assignee: Nuvatec, Inc., Downers Grove, Ill.

[21] Appl. No.: 696,571

[22] Filed: Jan. 30, 1985

[51] Int. Cl.$^4$ .................................................. G09B 7/00
[52] U.S. Cl. .................................. 434/335; 434/322; 434/327; 434/362
[58] Field of Search ................ 434/322, 327, 335, 362

[56] References Cited

U.S. PATENT DOCUMENTS 4,060,915 12/1977 Conway .............................. 434/362
4,359,222 11/1982 Smith, III et al. ............... 273/85 G
4,482,328 11/1984 Ferguson et al. .................... 434/335

Primary Examiner—Leo P. Picard
Attorney, Agent, or Firm—Willian Brinks Olds Hofer Gilson & Lione Ltd.

[57] ABSTRACT

A data entry terminal for storing a plurality of user generated answers is described which includes a removable volatile read/write memory module. The memory module is used to store formatting information used to configure the data entry terminal as appropriate for a particular set of questions. The memory module can for example store a set of correct answers as well as a set of user answers for each of the questions of the test, and it can store data used to disable certain functions of the data entry terminal, such as the ability of a user to revise an initially entered answer. The data entry terminal operates to record user answers in the portable memory module, which can then be removed from the data entry terminal and applied as an input to an external computer for analyzing user responses. The portable memory module includes a battery for powering a volatile semiconductor memory included in the module. The semiconductor memory is shielded against static discharge, and one of the chip enable terminals of the memory is coupled to a capacitor to prevent momentary voltage transients from changing the contents of the memory in an uncontrolled fashion.

8 Claims, 10 Drawing Figures

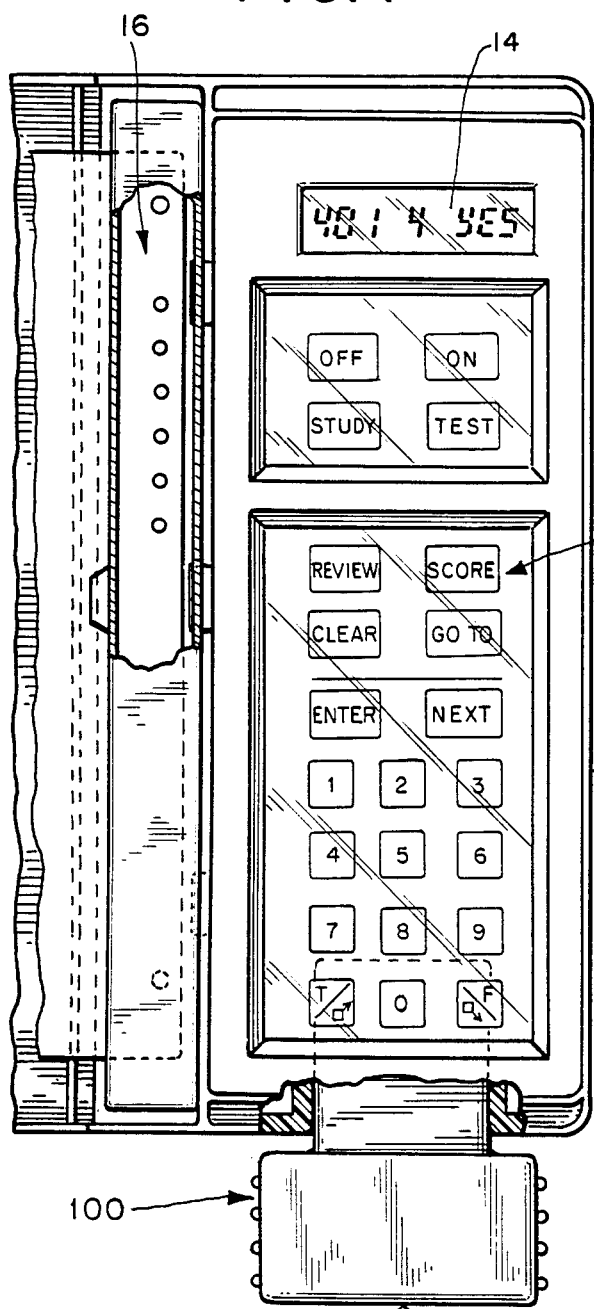
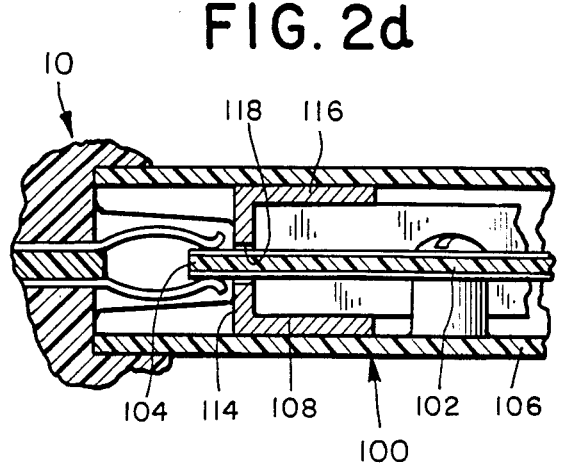
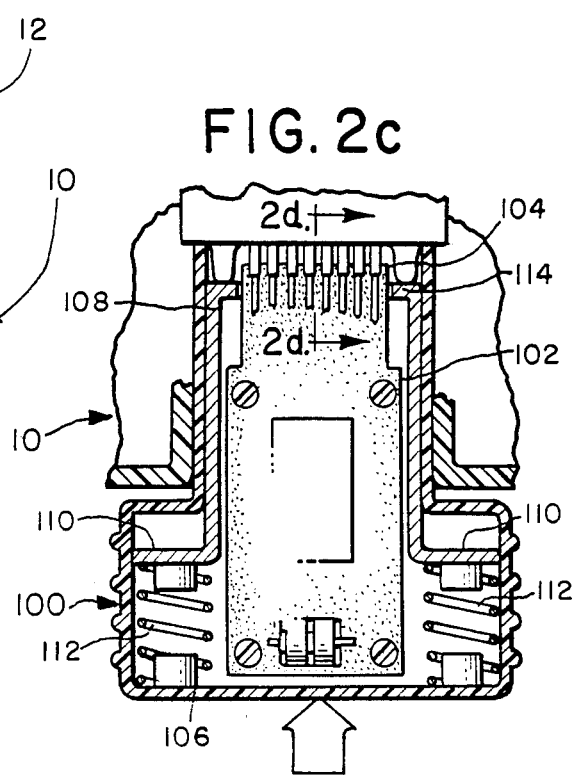
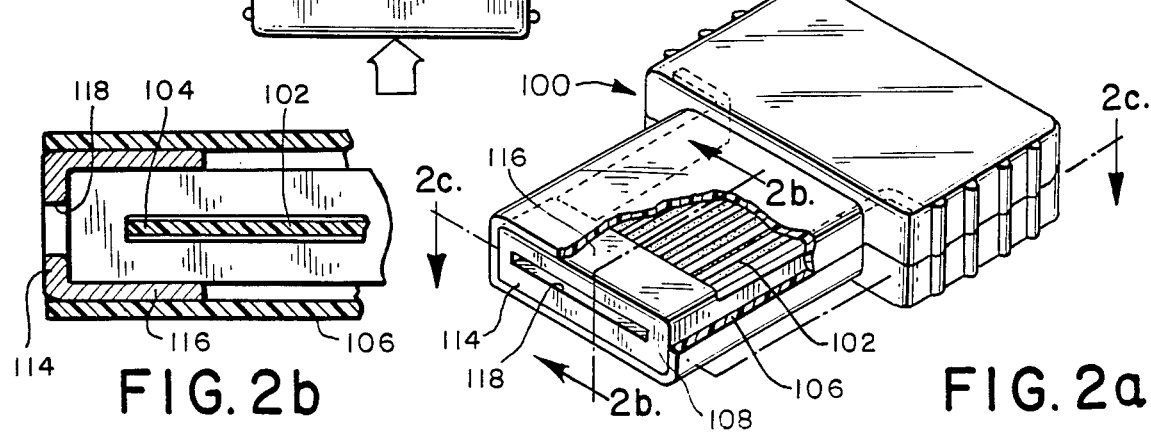

DATA ENTRY TERMINAL AND MEMORY MODULE THEREFOR

BACKGROUND OF THE INVENTION

This invention relates to a portable data entry terminal which can be used to store user responses to a selected set of questions and which records user responses in a removable memory module.

Standardized tests such as college entry examinations and the like are widely used to measure a user's abilities. In the past, such standardized tests have typically been administered with a paper answer sheet that must be filled in with pencil by the user. Alternately, punch cards have been used in which the user punches openings in the card to indicate his responses to the test questions.

This paper or punch card approach of the prior art brings with it a number of disadvantages. In the event the paper and pencil approach is used, the user is not prevented from revising his answers. On the other hand, when a punch card approach is used, the user is prevented from revising any answers. Paper scoring devices can often readily be mutilated and they allow the user to mistakenly enter multiple answers to any given question.

SUMMARY OF THE INVENTION

The present invention is directed to an improved system for recording user responses to a set of questions, which to a large extent overcomes the disadvantages of the prior art approaches set out above.

According to a first feature of this invention, a data entry terminal for storing a plurality of user generated answers is provided which includes a keyboard, a display, and a computer responsive to the keyboard and coupled to drive the display. A removable portable memory module is readily connected to and removed from the computer. This module includes both means for storing information indicative of a selected format for a set of questions and means for storing a plurality of user responses to the set of questions. Means are included in the computer for configuring the keyboard for the format of the set of questions in response to the stored information, and means are also included in the computer for storing user responses to the set of questions in the memory module.

This feature of the invention provides excellent flexibility to the data terminal, since the memory module actually configures the data terminal for the individual test. The following description will provide detailed examples of the manner in which the memory module can be used to configure the data entry terminal. However, by way of example, the memory module can be used to define the number of questions in the set of questions and to disable certain optional features of the data entry terminal, such as providing the user with the ability to revise initial answers to questions or to review questions. One particularly useful feature relates to the use of the memory module to allow a user to change initial answers only while he is in a certain section of the set of questions. Once the user leaves that section, further alterations to answers can be prevented. In this way, a reduced level of supervision is required to enforce the test rules. In addition, the memory module can be used to disable keyboard keys related to inappropriate answers. If a set of questions includes only true/false questions, the memory module can be used to disable keys related to multiple choice answers in the embodiment described below.

According to a second feature of this invention, a portable memory module for use with a data entry terminal of the type described above includes a portable housing adapted to be readily inserted into and removed from the terminal. This housing encloses a semiconductor memory which stores both a set of user answers to a set of questions and a set of data indicative of a selected format for the selected set of questions. The memory module may also be used to store a set of correct answers for the questions.

In the preferred embodiment described below, the semiconductor memory is a volatile read/write memory and a battery is mounted in the housing to power the memory, at least when the memory is not installed in place in the data entry terminal. Preferably, this memory includes a memory enable terminal to enable read/write operations of the memory, and a capacitor is coupled to the enable terminal to prevent momentary voltage spikes from enabling the memory. In this way, inadvertent writing into the memory can be substantially prevented.

The use of such a portable memory module brings with it important advantages. Because the user answers are stored electronically rather than by pencil marks or the like, the portable memory module of this invention provides excellent test security. Furthermore, this portable memory module is efficient in that user responses can readily be read from the portable memory module and stored for analysis and archival purposes. The portable memory module may be transported, as for example by mail if necessary, from a remote testing location to a central analysis location where the portable memory module is read by an analysis computer. If desired, the analysis computer can be located at the test site or coupled to the test site by telephone lines to provide excellent speed of scoring.

The invention itself, together with further objects and attendant advantages, will best be understood by reference to the following detailed description, taken in conjunction with the accompanying drawings.

BRIEF DESCRIPTION OF THE DRAWINGS

FIG. 1 is a front view of a preferred embodiment of the data entry terminal and the memory module of this invention.

FIG. 2a is a breakaway perspective view of the memory module of FIG. 1 showing a movable shield included in the memory module.

FIG. 2b is a partial sectional view taken along line 2b—2b of FIG. 2a.

FIG. 2c is a sectional view taken along line 2c—2c of FIG. 2a, showing the module inserted in the data terminal.

FIG. 2d is a sectional view taken along line 2d—2d of FIG. 2c.

DETAILED DESCRIPTION OF THE PRESENTLY PREFERRED EMBODIMENTS

Figure 3:
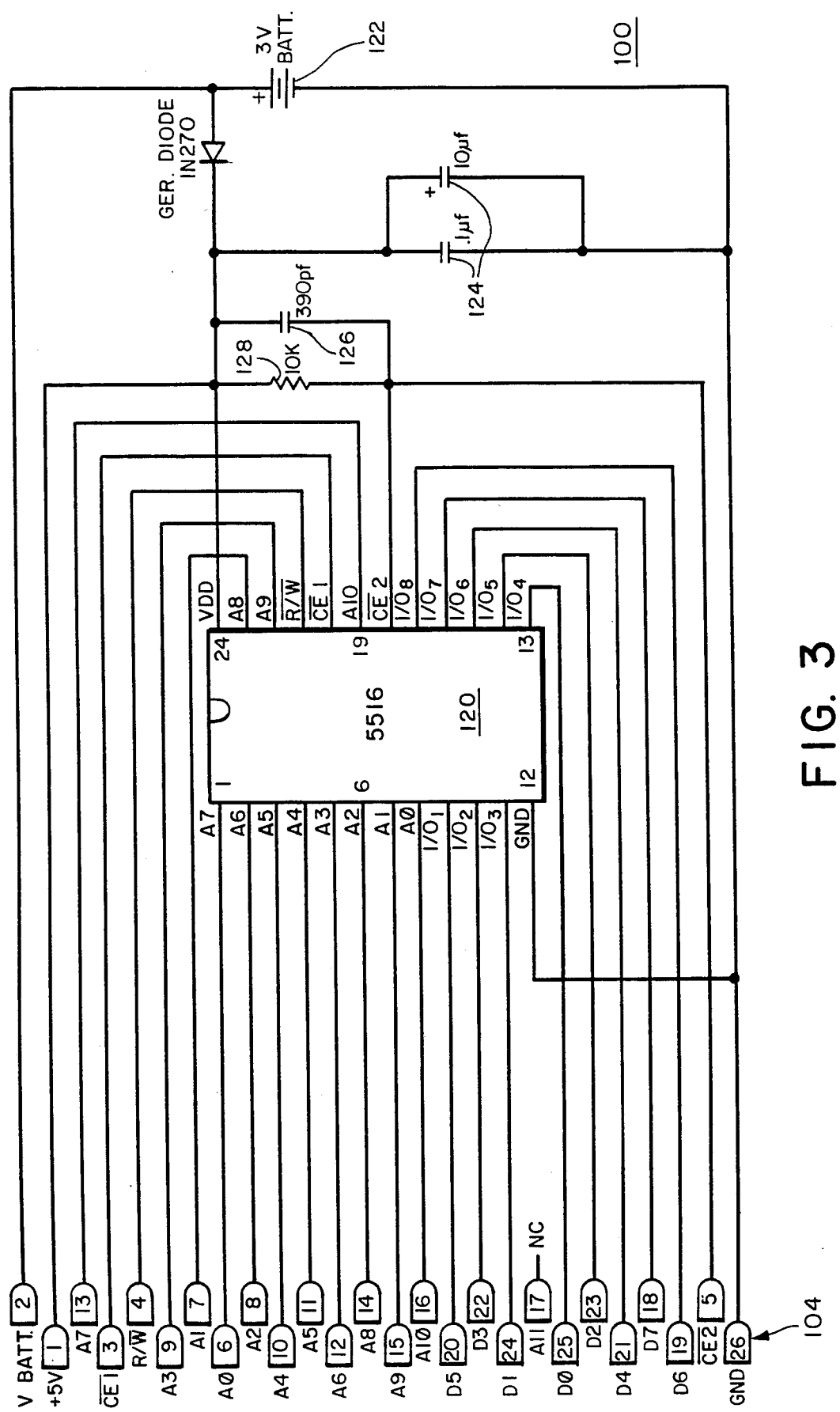
FIG. 3 is an electrical schematic diagram of the memory module of FIG. 1.

Turning now to the drawings, FIG. 1 shows a front view of presently preferred embodiments of the data terminal 10 and the memory module 100 of this invention.

The data terminal 10 is a portable, standalone data entry terminal for use by a test taker in entering responses to a series of questions. The data terminal 10 includes a keyboard 12 and a nine digit display 14. A set of page edge switches 16 is mounted at one side of the data terminal 10. These page edge switches 16 function in the manner described in U.S. Pat. No. 4,355,984 to sense a booklet code when the data terminal 10 is used in a Study mode.

The memory module 100 is a portable memory unit which can readily be connected to and disconnected from the data terminal 10. As shown in FIGS. 2a–2d, the memory module 100 includes a circuit board 102 which terminates at one edge in an edge connector 104. The circuit board 102 is surrounded by a housing 106, and the housing 106 protects the circuit board 102 from physical and electromagnetic damage.

A shield 108 is mounted to slide within the housing 106 between an extended position as shown in FIG. 2b and a retracted position as shown in FIG. 2d. The shield 108 defines two rear flanges 110, each of which is biased by a spring 112 to push the shield 108 to the extended position. The shield 108 includes a front panel 114 which is surrounded on all four sides by a peripheral wall 116. The front panel 114 defines a slot 118 through which the edge connector 104 protrudes when the shield 108 is pushed to the retracted position. The shield 108 is formed of an electrically conducting material such as a sheet metal, and it shields the circuit board 102 and the edge connector 104 from static discharge. The edge connector 104 is positioned completely behind the front panel 114 when the shield 108 is in its extended position. When the memory module 100 is inserted into the data terminal 10, the shield 108 is automatically pushed to its retracted position, thereby exposing the edge connector 104 (FIG. 2d).

FIG. 3 provides an electrical schematic drawing of the memory module 100. As shown in FIG. 3, the memory module 100 includes a volatile semiconductor random access memory 120. In this embodiment, the random access memory 120 stores 2 kilobytes of eight bit bytes. A battery 122 is mounted to the circuit board 102 to power the random access memory 120 when the memory module 100 is disconnected from the data terminal 10. In this embodiment, the battery 122 comprises two alkaline button batteries welded together in series. The memory module 100 includes power supply filters 124 to filter the voltage applied to pin 24 of the random access memory 120.

The random access memory 120 includes two chip enable terminals $\overline{CE1}$ and $\overline{CE2}$. $\overline{CE1}$ is conducted directly to the edge connector 104, while $\overline{CE2}$ is connected both to the edge connector 104 and via a capacitor 126 and a resistor 128 to the supply voltage for the random access memory 120. The resistor 128 insures that $\overline{CE2}$ is normally held high, thereby disabling the random access memory 120. When a logic low signal is applied to the $\overline{CE2}$ input of the edge connector 104, the capacitor 126 is discharged and the $\overline{CE2}$ input of the random access memory 120 is brought to the logic low state. When both the $\overline{CE1}$ and the $\overline{CE2}$ inputs of the random access memory 120 are both in the logic low state, the random access memory 120 is enabled. The capacitor 126 insures that the $\overline{CE2}$ input of the random access memory 120 is not brought to the logic low state by a momentary transient on the $\overline{CE2}$ input of the edge connector 104. In this way, transient voltages sometimes associated with installation of the memory module 100 into the data terminal 10 are prevented from corrupting the stored data of the random access memory 120.

In this embodiment, the housing 106 is formed of a conductive plastic such as that obtainable from Wilson Fiberfil. This conductive plastic includes minute stainless steel fibers which provide effective shielding to the random access memory 120. In addition, the spring biased shield 108 provides protection to the edge connector 104 against static discharges and the like. Simply by way of example, in this preferred embodiment, the random access memory 120 is a 2 kilobyte memory of the type obtainable from Toshiba as Part No. 5516 AP.

Additionally, in this embodiment, the +5 volt and ground conductors of the edge connector 104 are made somewhat longer than the remaining conductors to insure that the 5 volt supply voltage and the ground connection are applied to the random access memory 120 before any of the other terminals on the edge connector 104 become active. In this embodiment the +5 volt and ground terminals of the edge connector 104 extend beyond the remaining terminals by about one-sixteenth inch, thereby insuring that the +5 volt and ground connections are the first to be made and the last to be broken as the memory module 100 is inserted into and removed from the data terminal 10.

Figure 4:
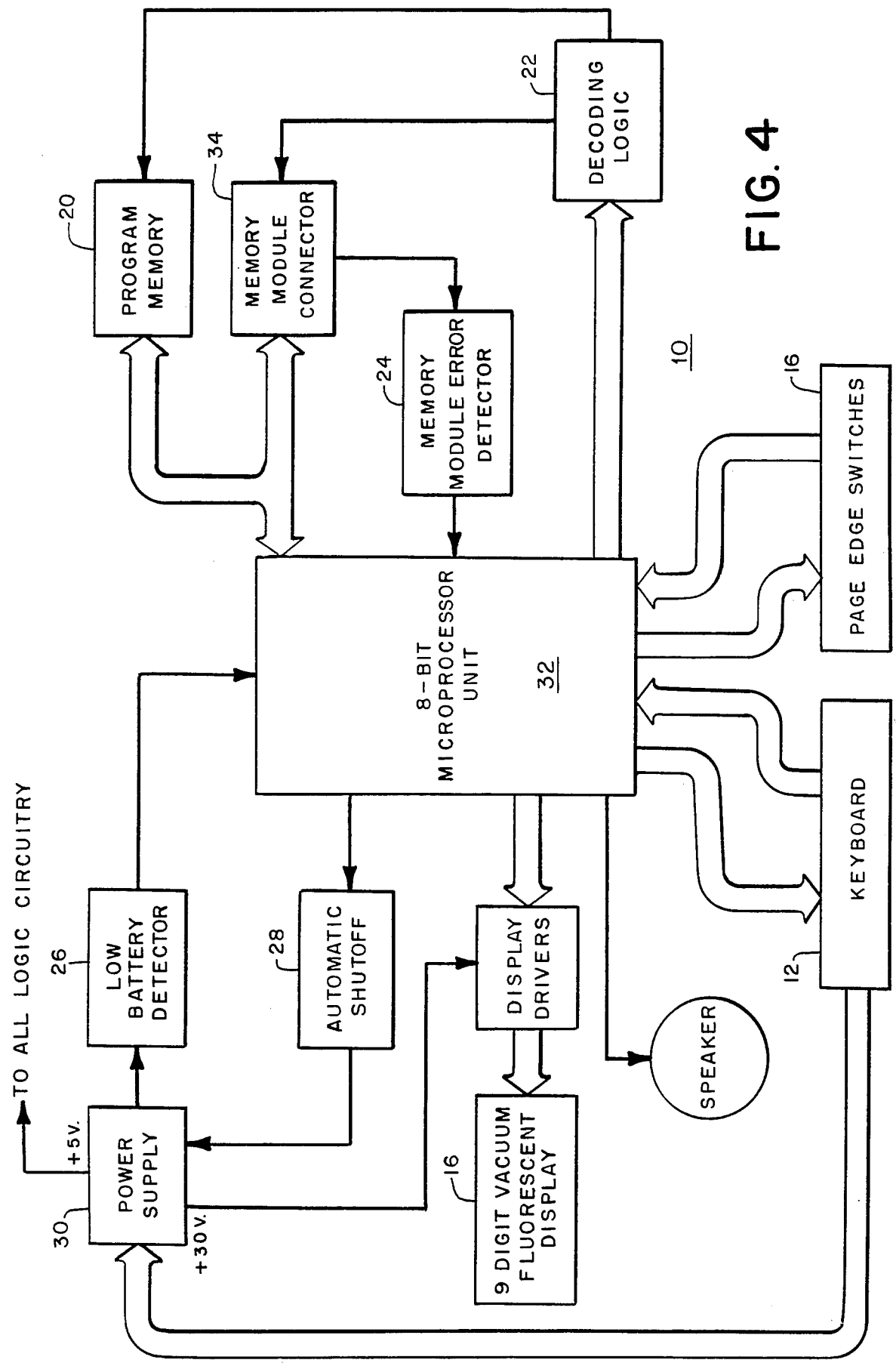
FIG. 4 is a block diagram of the data terminal of FIG. 1.
Figure 5A:
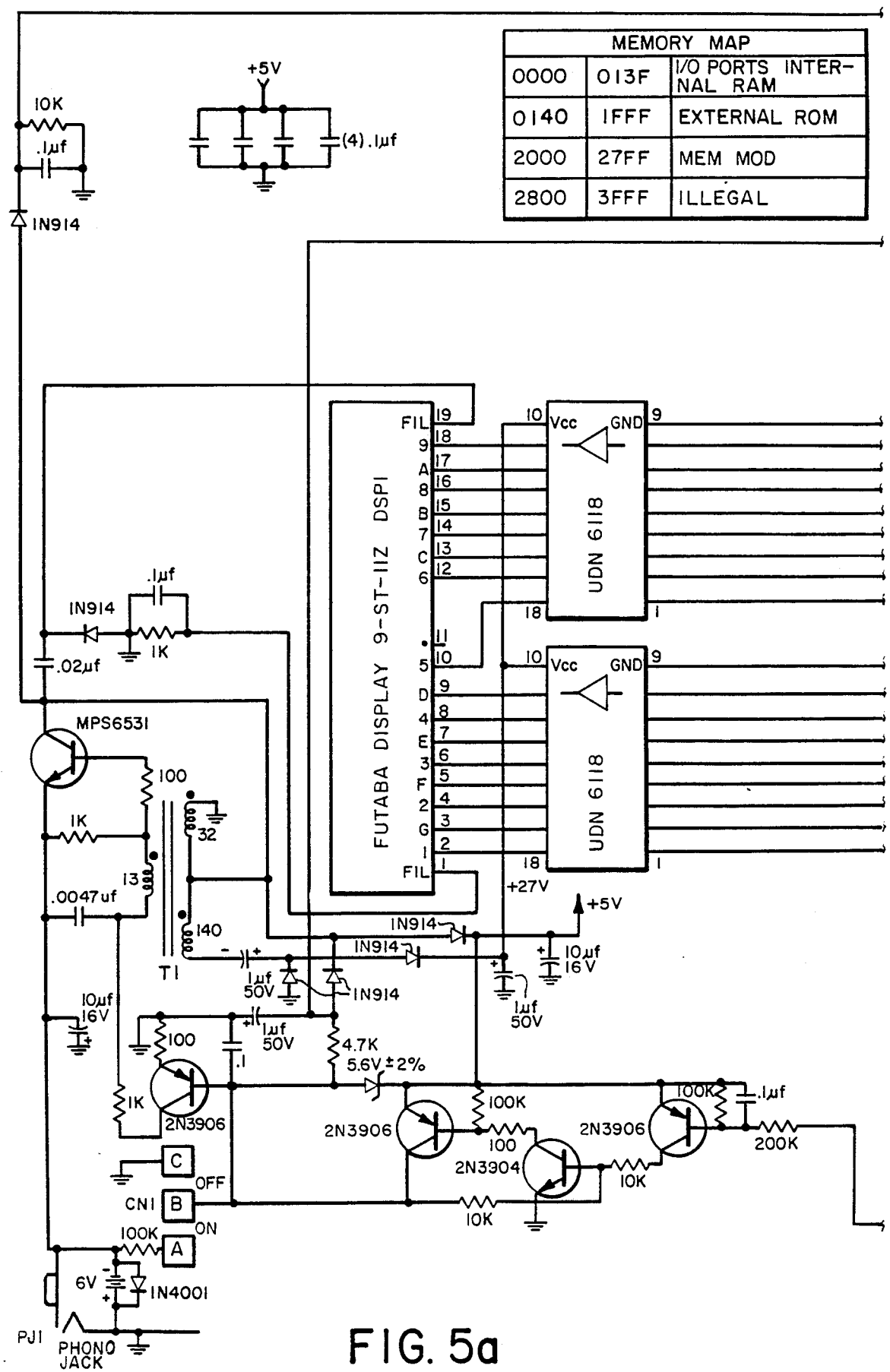
FIGS. 5a–5c, taken together, are an electrical schematic diagram of the data terminal of FIG. 1.
Figure 5B:
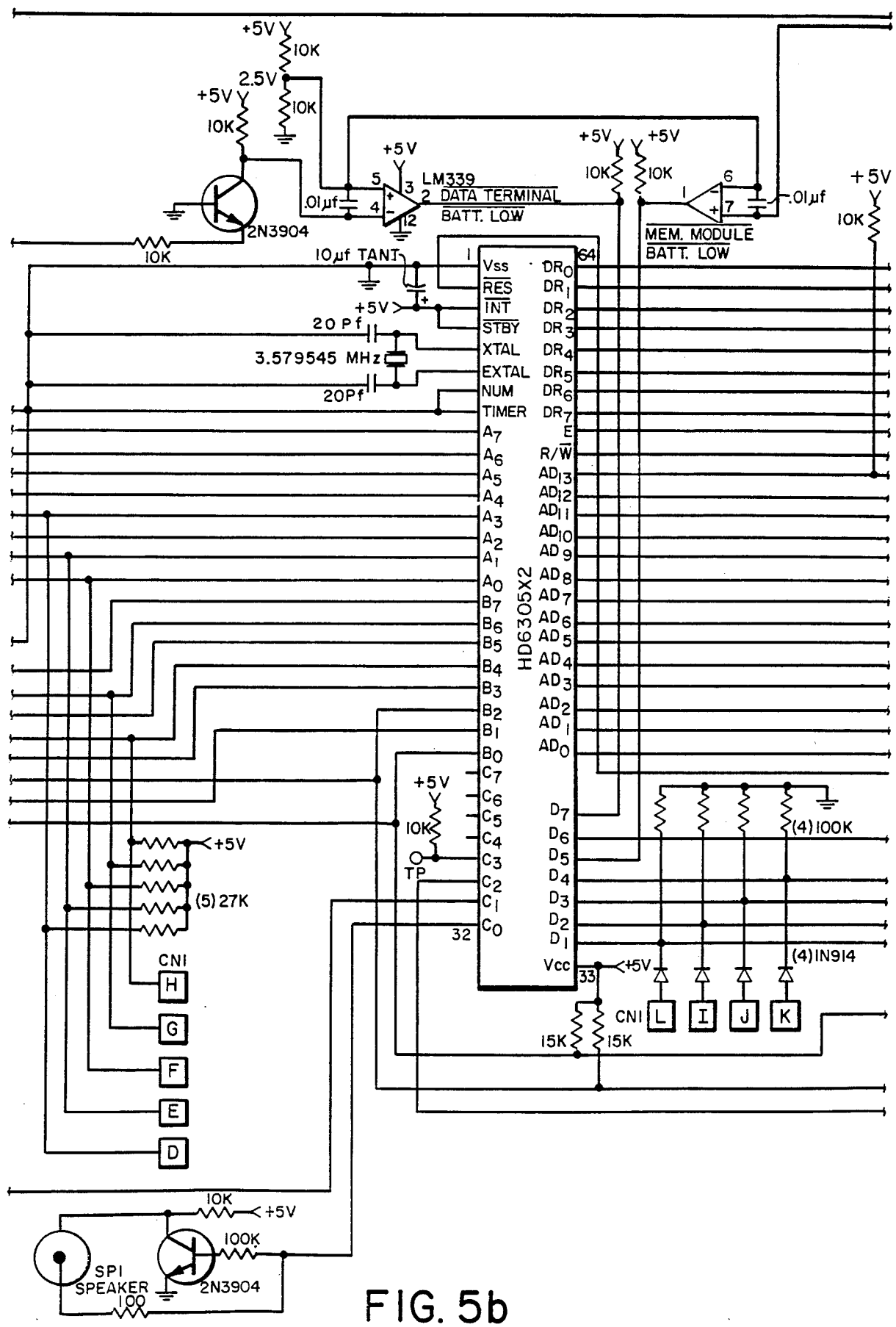
Figure 5C:
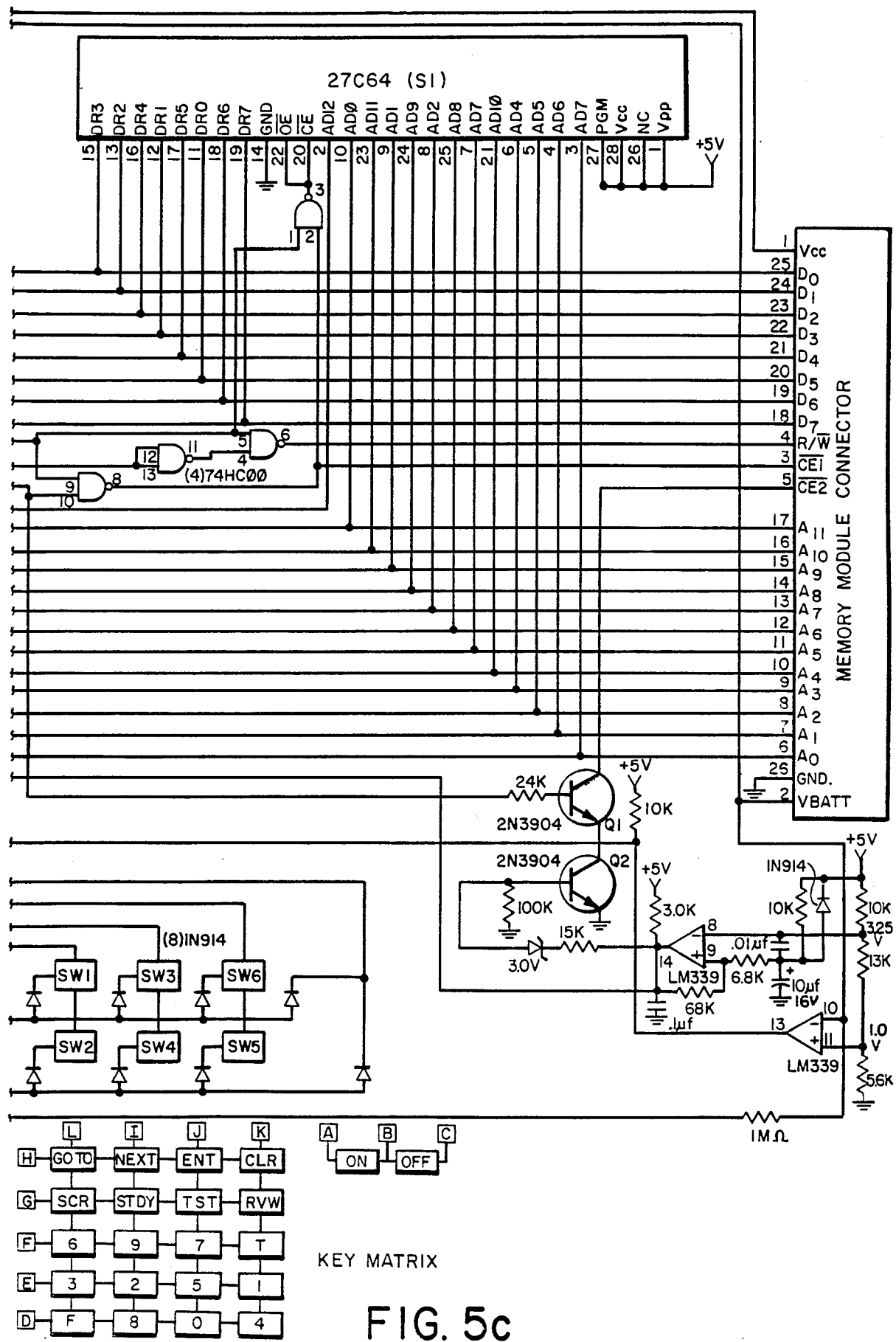

Turning now to FIGS. 4 and 5a–5c, the data terminal 10 is there shown in greater detail. Most of the following discussion will deal with the block diagram of FIG. 4; the electrical schematic of FIGS. 5a–5c is provided in order to completely define the presently preferred embodiment of the data terminal.

As shown in FIG. 4, the data terminal 10 includes an 8 bit microprocessor 32 which executes a program stored in a program memory 20. A suitable microprocessor is the Hitachi CMOS 6305 microprocessor. In this embodiment, the program memory 20 is an EPROM which includes 8 kilobytes of 8 bit bytes. A memory module connector 34 is coupled to the microprocessor 32 and is used to interconnect the microprocessor 32 with the memory module 100. A power supply 30 provides power to the various components of the data terminal 10, and an automatic shut-off circuit 28 is controlled by the computer to shut-off the power supply 30 automatically if no keys of the keyboard 12 have been pressed in the last hour. In the electrical schematic of FIG. 5, the automatic shut-off control lead of the microprocessor 32 is designated with the symbol C1.

The data terminal 10 also includes a low battery detector 26. In this embodiment, the data terminal 10 can be operated either from internal alkaline batteries or an externally introduced 6 volt DC supply voltage. The low battery detector 26 generates a signal on input terminal D7 of the microprocessor 32 in the event the battery voltage level falls below a preset value.

Similarly, the data terminal 10 includes a memory module error detection circuit 24 which monitors the voltage of the battery 122 included in the memory module 100. In the event the voltage of the battery 122 falls below 2½ volts, a signal is generated on input terminal D5 of the microprocessor 32. The memory module error detector 24 also compares the voltage of the battery 122 of the memory module 100 against a threshold of one volt and supplies a signal to input D6 of the microprocessor 32 in the event the voltage of the battery 122 falls below this one volt threshold. The signal on input terminal D6 of microprocessor 32 is used as an indication of the presence or absence of a memory module 100 in the connector 34.

In the schematic diagram of FIG. 5, the comparator in the lower, right-hand part of FIG. 5c which includes output pin 14 is used to hold the transistor Q2 in a non-conducting state during power up, thereby preventing terminal $\overline{CE2}$ from being grounded and holding the microprocessor 32 in reset. The transistor Q1 is placed in the conducting state by address line AD13 in order to enable $\overline{CE2}$ when the transistor Q2 is conducting. Thus, the decoding logic 22 prevents the $\overline{CE2}$ terminal from being enabled until after the microprocessor has been powered up properly.

The interconnections between the microprocessor 32, the program memory 20, and the connector 34 have been arranged to eliminate crossed leads. The schematic diagram of FIGS. 5a-5c shows the detailed interconnections between these components, and these interconnections can be laid out on a printed circuit board in such a way that none of the interconnections between these components crosses. Of course, the same interconnection scheme is used in the memory module, as shown in FIG. 3. This arrangement does not follow the usual convention (e.g. DO of the microprocessor 32 is connected to DR3 of the program memory 20); however, it provides important advantages in size reduction. Because the interconnections do not cross one another, the printed circuit board layout can be made smaller and more compact.

This arrangement requires a logical to physical translation of memory locations and data, in both the program memory 20 and the memory module 100. All subsequent references are to logical, rather than physical memory locations and data.

Table 1 identifies the information stored in the random access memory 120 of the memory module 100. The manner in which this information is used by the data terminal 10 will be explained in detail below.

The memory of the memory module 100 is organized as six separate fields. The first is an identification field which stores an identification number of the user and a checksum. If the memory module is programmed with the identification number of the intended user, the data terminal 10 operates to insure that only a user knowing the preprogrammed identification number can record user answers in the memory module. The checksum operates in the conventional manner to check the accuracy of the stored identification number.

The second field is a demographic field which stores information related to the test for which the memory module is programmed and information regarding the test. In this exemplary embodiment, the demographic field includes the serial number of the memory module, the number of the test for which the module is programmed, and a checksum. Additional information can be recorded in the demographic field as desired. In this embodiment, the demographic field also includes a Used/Transcribed Flag which is set and reset to indicate the status of the memory module. The data terminal sets this flag at the time a user answer is stored in the memory module to indicate that the memory module contains stored user answers to be transcribed, or read out for analysis. This flag should be reset once the memory module has been transcribed. Preferably, reprogramming of the memory module is disabled unless the flag is reset, thereby preventing the inadvertent loss of stored user answers.

The third section is the section header field. A section header is provided for each section of the test, and this embodiment allows up to 20 separate test sections. Each section header includes the starting address at which user answers will be stored in the memory module 100, the starting address at which correct answers are stored in the memory module 100, the starting question number of the section, and the final question number of the section. In addition, the section header field includes two bytes of memory, one to store the Re-enter flags and the other to store the Rules flags for the section. Together, these flags are used to configure the data terminal as appropriate for the respective section of the test for which the memory module 100 is programmed. The significance of these flags will be discussed in detail below.

The fourth field is the user answer field used to store user answers. The user answer field is organized into sectors, each of which can be used to store up to ten user answers. Each sector of the user answer field includes five bytes of memory used to store user answers (two answers per byte). In addition, each user answer field includes a checksum byte for the five bytes of answers of the sector and a byte of write error flags. The byte of write error flags includes six separate flags, one for each of the other bytes of the sector. If in writing to the memory module 100 it is determined that a byte of the user answer field sector will not accurately store data, the respective write error flag can be set to indicate the failure.

The fifth field, when supplied, is the correct answer field, which is again organized into sectors, each of which stores up to ten answers. In this case, the stored answers are correct answers for the respective questions. Each sector of the correct answer field includes five bytes which store correct answers (two answers per byte), a checksum byte, and a write error flag byte as described above. The correct answer field can be deleted if desired.

The final field of the memory module 100 is a message field in which up to four 20 byte messages can be stored.

One power up, the microprocessor 32 clears all necessary RAM, and initializes all ports, timers and interrupts. After initialization, a direct check of the keyboard is made to see if either the Go To or Test keys were depressed at power up. If so, an appropriate special service routine is executed, which is not part of this invention. If not, one of the input port bits is checked to see if it is in the logic low state. If it is, a diagnostics routine is executed, which likewise does not form part of this invention. Then, input terminal D6 is checked to see if a valid memory module is in place in the data terminal. If the signal on input terminal D6 indicates that no memory module is in place, the data terminal is caused to operate in the Study or Test modes, which are substantially identical to that described in U.S. Pat. No. 4,355,984. On the other hand, if the signal on input terminal D6 indicates the presence of a memory module, the data terminal prepares to enter the Exam mode described below.

Assuming that a memory module is installed in place in the data terminal, the next step is to check the signal on input terminal D5 to ensure that the voltage of the battery of the memory module is adequate. If the signal on input terminal D5 indicates a low battery voltage for the memory module, the program aborts with an error code No. 1 (module power low). The program continues to check the memory module battery voltage periodically.

Memory location 000CH is then read and stored in RAM. If bit 7 of this byte is set, the microprocessor 32 will cause sounds to be generated at each key press. Throughout this description, memory addresses in the memory module are identified as four-place hex numbers, and the terminal H is used to indicate that the address is a hexidecimal address.

The program then forms a checksum for the first 8 bytes of each section header in the section header field of the memory module and compares it with the 11th byte. If an error is found, the program will abort with an error code No. 2 (incorrect header checksum). If a last section is encountered (by recognizing the appropriate flag of the Rules flags of the section) then the headers are considered valid and the program proceeds. By way of explanation, this program is set up such that the last section header is in addition to the section headers actually used for the programmed test. Thus, if there are 20 sections of the test, there will be 21 section headers in the memory module.

After the section headers have been checked, the demographic field is checked. A checksum is formed beginning at a location after the ID number field at addresss 0007H and continuing to address 000DH, with the checksum located at 000EH. Again, if a checksum error is found, the program aborts with error code No. 2 displayed.

The last major step in initializing the data terminal in this mode of operation is to check the ID number stored in the identification field of the memory module. The ID number is in locations 0001H–0005H of the memory module, with a checksum at location 0006H. In this embodiment, address 0000H of the module is not used, as this byte can be corrupted when the module is inserted into or withdrawn from the data terminal. In this embodiment, the ID number is a nine-digit BCD number.

There are three types of ID numbers possible as follows. When the ID number is 000000000H, the user is prompted to enter an ID number which is then written into the memory module. When the ID number is FFFFFFFFFH, the user is taken directly to the start of the test, thereby by-passing any ID number checking. This feature allows the data terminal to be used in situations where the identity of the user is not a concern. Finally, when the ID number is any other nine-digit combination, the data terminal prompts the user for the entry of an ID number and then compares the entered ID number with the ID number stored in the module. If these two numbers are not equal, the program reprompts the user for entry of an ID number. Once the entered ID number is equal to the stored ID number, the program enters the Exam mode. When the stored ID number is initially all zeros, the microprocessor is programmed to calculate an appropriate checksum once the user enters his own ID number, and to store the calculated checksum along with the newly entered ID number in the memory module. In addition, the microprocessor checks the memory module to ensure that the stored ID number and checksum are recorded properly. In the event an ID number write error is detected, the program aborts with error code No. 5 (ID number write error).

If a number other than all zeros is stored in the memory module ID field, the checksum on the stored number is calculated and compared with the stored checksum at address 0006H. If not equal, the program aborts with error code No. 4 (bad ID Number checksum). If the checksum is accurate, the display is cleared and the prompt "ID" is placed on the display positions 1 and 2. Once the Enter key is depressed, the program checks to see if nine digits have been entered, and if not, the entered number is filled with leading zeros to make nine digits. Then the ID number entered by the user is compared to the stored ID number. If all nine digits match, program flow goes to the start of the test. Otherwise, the user is prompted to re-enter the ID number.

After the ID number function has been successfully completed, the program first attempts to find an unlocked section by scanning all section headers in the memory module starting with the first, and halting at the first section which is unlocked as indicated by the re-enter flags for that section. In this embodiment, no user answers are stored in a locked section. If none of the sectionsare unlocked, then no further user answers can be entered into the memory module.

When the first unlocked section is found, the information from the section header field is retrieved the memory module and stored in RAM. Then the first question number is retrieved from the section header and this number, along with any user answer which may already be stored in the memory module, is displayed as the user's prompt. In this program, a stored answer which is OH is a "preanswered" question for which no answer will be stored. A stored answer which is FH is one for which no user answer has yet been stored.

A loop is then called which fetches a key press and returns the value only if it is not zero. A zero key press is trapped and is used to toggle sounds on and off. Upon return, a series of compares is performed to determine which key was pressed, and a jump to the appropriate subroutine is made. Upon completion of the selected function, the loop is reentered, and the current or next question number is displayed as a prompt, depending upon the current operational rules.

The following discussion takes up each of the possible keystrokes and the function resulting from the keystroke. During the Exam mode of operation the Study and Test keys are not functional.

Review

The Review key is functional only if bit 3 in the Rules byte of the appropriate section header is set to Logic 1. If enabled, the Review key causes the program to search, starting with the lowest question number, for unanswered questions in the current section only. Subsequent operations of the Review key will search for the next unanswered question. Operation terminates when there are no unanswered questions in the section, or when the question number at which the user was positioned when the Review key was first pressed is encountered.

Score

The Score key is functional only if bit 7 of the Re-enter byte of the previous section header is set to Logic 1, and if the previous section has been locked to prevent any further user answers from being stored or altered. The Score key, if functional, causes the number of correct answers in the previous section to be calculated and displayed. The re-enter flags byte includes two scoring enable bits which define three modes of scoring as follows:

1. When both bits 4 and 6 are in the Logic 0 state only the score (number of correct answers out of the total number of questions) is displayed.
2. When bit 4 is in the Logic 1 state and bit 6 is in the Logic 0 state, both the score and all incorrectly answered questions are displayed.
3. When bit 4 is in the Logic 0 state, and bit 6 is in the Logic 1 state, the score is displayed, along with the incorrect and the correct answers for each of the incorrectly answered questions.
4. Bits 4 and 6, when both in the Logic 1 state, represent an invalid combination.

Clear

The purpose of the Clear key depends upon the current operation. If in the Score or Go To modes, the Clear key terminates the operation of the program in that mode. If the user is viewing a previously answered question, the Clear key allows erasure of the answer if bit 1 of the Rules byte (revision of answers) is set to Logic 1. If the user is answering a question but Enter has not been pressed, the Clear key will remove the answer from the display.

Go To

The Go To key is functional only if bit 2 of the Rules byte is set to Logic 1. When the Go To key is pressed, it allows the user to go to a different question number. The display will prompt with a "?" character and keys 0–9 and Clear will be enabled to allow the user to enter a desired question number. When a three-digit number is entered, the memory module is searched for the existence of that question. If it exists, and if it is in an unlocked section, the user is taken to that question. Otherwise, the user is returned to the question displayed when the Go To key was pressed. When the Go To key is used to leave a lockable section, that section is automatically locked to prevent further alterations to stored answers of that section.

Enter

The Enter key when pressed causes the microprocessor to store a user-entered answer to a selected question into the memory module at the memory address associated with the currently displayed question number.

Next

The Next key operates in a manner similar to that of the Go To key described above, except that the next question in the current section is selected. During the Score function, if the display of incorrect answers has been enabled, the Next key will step to the next incorrect answer. The Next key cannot be used to cross section boundaries. If bit 0 of the Rules byte for the section has been set, then the Auto-Next function is enabled. This feature executes an automatic "Next" operation after the entry of each question.

True/False

The True and False keys are used for answering True/False questions if bit 5 in the Rules byte is set to Logic 1. If this flag is set to Logic 0, these keys are ignored.

Zero

With certain exceptions, the Zero key causes sounds resulting from key presses to be turned on or off. Such sounds can be disabled by resetting bit 0 at address 000CH of the memory module. If sounds have not been enabled, the Zero key is ignored. In the Go To operation, the Zero key causes entry of a number 0 and has no effect on sounds. In this program, Zero is never a valid answer to a test question and cannot be used to answer a question.

1–9

In the Exam mode, numerical entry is assumed to be an answer to the currently displayed question. The range of allowable numbers is set in bits 0–3 of the Re-enter byte. If bits 0–3 are all equal to zero, then numerical answering is disallowed. Otherwise, the value of bits 0–3 represents the highest number which will be accepted. Invalid numbers are ignored. During the Go To function, all digits may be used to select a question number.

From this description, it should be apparent that the memory module configures the data terminal as appropriate for the particular test for which the memory module has been programmed. Appropriate locations of the memory module define the number of sections of the test, and they define the format for each section of the test. For example, each section can either be lockable or not and if lockable, it can either be locked or unlocked. When locked, no further user answers are stored. Other flags stored in the memory module define (for each section) whether answers in the section are to be displayed and whether scoring of that section is to be allowed. Other flags define whether the revising of answers is to be allowed, whether the Auto-Next function is enabled, whether the Go To function is enabled, and whether the user will be allowed to review unanswered questions. Other flags define whether True/False answers will be allowed and define the particular scoring mode.

Thus, the memory module defines the format of the test to be administered by the data terminal, and it provides excellent flexibility to the test designer in setting the rules that will be in force for each section of the test. Since the rules are stored on a section-by-section basis, it is a simple matter for the test designer to specify differing rules for differing parts of the test. For example, one part of the test may be a True/False set of questions in which no revisions to user-entered answers are allowed, and another section may be a multiple choice section in which the user is allowed to revise answers, either at any time during the test, or only while he is in that section of the test.

Of course, it should be understood that a wide range of changes and modifications can be made to the preferred embodiments described above. Furthermore, these embodiments can readily be used in connection with a wide variety of data entry projects, including standardized tests and surveys. It is therefore intended that the foregoing description be regarded illustrative rather than limiting, and that it be understood that it is the following claims, including all equivalents, which are intended to define the scope of this invention.

TABLE 1

A. Identification Field
  1. ID Number
  2. Checksum
B. Demographic field
  1. Test Number
  2. Memory Module Serial Number
  3. Demographic Pointer
  4. Used/Transcribed Flag
  5. Checksum
C. Section Header Field (One for each Section of Test)
  1. Starting Address of User Answer Area
  2. Starting Address of Correct Answer Area
  3. Starting Question Number of Section
  4. Final Question Number of Section
  5. Re-Enter Flags for Section
    a. BCD value of highest multiple choice answer allowed (four bits)
    b. whether section lockable
    c. whether section locked
    d. whether scoring enabled
  6. Rules Flags for Section
    a. whether Auto-Next enabled
    b. whether revising of answers allowed
    c. whether Go To enabled
    d. whether review of unanswered questions enabled
    e. whether True/False enabled
    f. last section flag
    g. scoring mode (two bits)
  7. Checksum
D. User Answer Field (One for each Sector of up to Ten Answers)
  1. 5 Bytes of answers (two answers per byte)
  2. Check sum
  3. Write error flags
E. Correct Answer Field (One for each Sector of up to Ten Answers)
  1. 5 bytes of answers (two answers per byte)
  2. Check sum
  3. Write error flags
F. Message Field
  1. Up to four 20 byte messages

We claim:

1. A portable data entry terminal for storing a plurality of user generated responses, said terminal comprising:
   a keyboard comprising means for generating keyboard entries in response to user activation of the keyboard;
   a display;
   a computer responsive to the keyboard entries and coupled to drive the display;
   a removable, portable read/write memory module readily connected to and removed from the computer, said memory module comprising both means for storing information indicative of a selected format for a set of questions, and means for storing a plurality of user responses to the set of questions;
   means, included in the computer and responsive to the stored information, for configuring the keyboard for the format of the set of questions, said configuring means comprising means for disabling selected keyboard entries in response to the stored information to enforce user compliance with the selected format;
   means, included in the computer, for storing the user responses to the set of questions in the memory module; and
   means, included in the computer, for storing a selected code in the memory module when the memory module has been used to store at least one of the user answers in order to indicate that the memory module has been used.

2. The invention of claim 1 wherein the stored information comprises means for indicating a selected number of questions in the set of questions, and wherein the storing means operates to store user responses to the selected number of questions.

3. The invention of claim 1 wherein the keyboard comprises a true key, a false key and a plurality of multiple choice answer keys, wherein the stored information comprises means for indicating whether the set of questions includes true/false questions, and wherein the configuring means comprises means, responsive to selected values of the stored information, for disabling the multiple choice answer keys as responses for the true/false questions.

4. The invention of claim 1 wherein the keyboard comprises a plurality of multiple choice answer keys, wherein the stored information comprises means for indicating a range of possible answers to be accepted for a plurality of multiple choice questions included in the set of questions, and wherein the configuring means comprises means, responsive to selected values of the stored information, for disabling the multiple choice answer keys outside the range as responses to the multiple choice questions.

5. The invention of claim 1 wherein the stored information comprises means for indicating a set of correct answers for the set of questions, and wherein the computer comprises means for controlling the display to display the correct answers.

6. The invention of claim 1 wherein the stored information comprises means for indicationg a set of keys of the keyboard to be disabled, and wherein the configuring means comprises means, responsive to selected values of the stored information, for disabling the set if keys, 7. The invention of claim 1 wherein the computer comprises a microprocessor and a memory, each of which defines a set of address terminals and a set of data terminals, and wherein noncrossing interconnections are provided between the respective address terminals of the microporcessor and the memory and between the respective data terminals of the microprocessor and the memory.

8. A portable data entry terminal for storing a plurality of user generated responses, said terminal comprising:
   a keyboard comprising means for generating keyboard entries in response to user activation of the keyboard;
   a display;
   a computer responsive to the keyboard entries and coupled to drive the display;
   a removable, portable read/write memory module readily connected to and removed from the computer, said memory module comprising both means for storing information indicative of a selected fromat for a set of questions, and means for storing a plurality of user responses to the set of questions;
   means, included in the computer and responsive to the stored information, for configuring the keyboard for the format of the set of questions, said configuring means comprising means for disabling selected keyboard entries in response to the stored information to enforce user compliance with the selected format; and
   means, included in the computer, for storing the user responses to the set of questions in the memory module;

wherein the stored information comprises means for indicating the extend a user will be allowed to alter a previously stored user answer, and wherein the configuring means comprises means, responsive to selected values of the stored information, for preventing the user from altering a previously stored user answer.

* * * * *

UNITED STATES PATENT AND TRADEMARK OFFICE
CERTIFICATE OF CORRECTION

PATENT NO. : 4,682,958

DATED : July 28, 1987

INVENTOR(S) : William H. Slavik et al.

It is certified that error appears in the above-identified patent and that said Letters Patent is hereby corrected as shown below:

In column 6, between lines 49 and 50, please insert the following paragraph:

--A complete listing of the program stored in the program memory 20 of the data terminal 10 is attached hereto as Appendix A. This listing is intended as the complete, definitive disclosure of the presently preferred embodiment of the program of the data entry terminal 10. The following discussion is provided to clarify the operation of this program, and it is organized generally in the order in which operations are performed following the application of power to the microprocessor 32.--

In column 6, line 50, please delete "One" and substitute therefor --On--.

In column 8, line 26, please delete "sectionsare" and substitute therefor --sections are--.

In column 8, line 29, after "retrieved", please insert --from--.

In column 10, line 42, after "True/", please delete -- - --.

In column 12, line 13, after "true/", please delete -- - --.

In column 12, line 31, please delete "indicationg" and substitute therefor --indicating--.

UNITED STATES PATENT AND TRADEMARK OFFICE
CERTIFICATE OF CORRECTION

PATENT NO. : 4,682,958

DATED : July 28, 1987

INVENTOR(S) : William H. Slavik et al.

It is certified that error appears in the above-identified patent and that said Letters Patent is hereby corrected as shown below:

In column 12, line 34, please delete "if" and substitute therefor --of--.

In column 12, line 35, please delete "," and substitute therefor --.--.

In column 12, line 41, please delete "microporcessor" and substitute therefor --microprocessor--.

In column 12, line 57, please delete "fromat" and substitute therefor --format--.

Signed and Sealed this

Twenty-fifth Day of July, 1989

Attest:

DONALD J. QUIGG

Attesting Officer

Commissioner of Patents and Trademarks